United States Patent
Courter

(10) Patent No.: US 12,086,175 B2
(45) Date of Patent: *Sep. 10, 2024

(54) METHOD AND APPARATUS FOR THE CONVERSION AND DISPLAY OF DATA

(71) Applicant: FULCRUM 103, LTD., Hoffman Estates, IL (US)

(72) Inventor: Craig Courter, Chicago, IL (US)

(73) Assignee: FULCRUM 103, LTD., Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,302

(22) Filed: Apr. 5, 2023

(65) Prior Publication Data
US 2023/0350934 A1 Nov. 2, 2023

Related U.S. Application Data

(63) Continuation of application No. 17/474,401, filed on Sep. 14, 2021, now Pat. No. 11,651,017, which is a
(Continued)

(51) Int. Cl.
*G06F 16/25* (2019.01)
*G06F 16/2452* (2019.01)
(Continued)

(52) U.S. Cl.
CPC ...... *G06F 16/367* (2019.01); *G06F 16/24522* (2019.01); *G06F 16/252* (2019.01);
(Continued)

(58) Field of Classification Search
CPC .... G06F 16/367; G06F 16/284; G06F 16/256; G06F 16/24522; G06F 16/252; G06F 40/30; H04L 63/102
(Continued)

(56) References Cited

U.S. PATENT DOCUMENTS 4,905,138 A * 2/1990 Bourne ............... H04L 9/40 717/139
6,640,231 B1 * 10/2003 Andersen ............ G06F 16/30 707/999.102

(Continued)

OTHER PUBLICATIONS

F. Michel et al., "A survey of RDB to RDF translation approaches and tools," Retrieved from the Internet: URL: https://1 hal.archives-ouvertes.fr/file/index/docid/903568/filename/Michel_Montagnat_Faron_2013_-A_survey_of_RDB_to_RDF translation_approaches_and_tools.pdf, Nov. 2013, 26 pages.

(Continued)

*Primary Examiner* — Hanh B Thai
(74) *Attorney, Agent, or Firm* — GLOBAL IP COUNSELORS, LLP

(57) ABSTRACT

A configuration workstation generates configuration tables representative of applications that each comprise one or more object data structures. Each of the object data structures are linked to one or more staging databases that, in turn, obtain data from one or more standalone data sources. Each of the object data structures comprises at least one property that defines available data for the object data structure. The configuration tables are provided to a controller that obtains data from the staging database(s). The controller also causes the obtained data to be converted to the semantic data format and stored in a semantic database. A web server obtains requested semantic data from the semantic database for at least some of the object data structures for an application. The web server then generates a user interface based on the requested semantic data and provides it to a user device for display.

14 Claims, 15 Drawing Sheets

Related U.S. Application Data continuation of application No. 16/101,491, filed on Aug. 12, 2018, now Pat. No. 11,144,583.

(60) Provisional application No. 62/544,819, filed on Aug. 12, 2017.

(51) Int. Cl.
*G06F 16/28* (2019.01)
*G06F 16/36* (2019.01)
*G06F 40/30* (2020.01)
*H04L 9/40* (2022.01)

(52) U.S. Cl.
CPC .......... *G06F 16/256* (2019.01); *G06F 16/284* (2019.01); *G06F 40/30* (2020.01); *H04L 63/102* (2013.01)

(58) Field of Classification Search
USPC .......................................................... 707/802
See application file for complete search history.

(56) References Cited

U.S. PATENT DOCUMENTS

| | | | | |
|---|---|---|---|---|
| 7,503,027 | B1* | 3/2009 | Zhao | G01R 31/318357 716/104 |
| 7,673,340 | B1* | 3/2010 | Cohen | G06F 11/3438 379/266.08 |
| 7,685,155 | B2* | 3/2010 | Cengiz | G06F 16/289 707/999.103 |
| 7,702,694 | B1* | 4/2010 | Perkins | G06F 16/213 707/790 |
| 8,073,843 | B2* | 12/2011 | Chandrasekar | G06F 16/8365 707/718 |
| 8,141,011 | B1* | 3/2012 | Zhao | G01R 31/318328 716/136 |
| 8,381,166 | B2* | 2/2013 | Wason | G06F 9/44505 707/705 |
| 8,856,179 | B2* | 10/2014 | Karnam | H04W 4/14 707/802 |
| 9,043,895 | B2* | 5/2015 | Maman | G06F 16/2455 726/12 |
| 9,046,979 | B2* | 6/2015 | Nack | G06F 8/34 |
| 9,710,529 | B2* | 7/2017 | Singh | G06F 16/2365 |
| 10,402,420 | B2* | 9/2019 | Brown | G06F 16/2291 |
| 10,873,504 | B1* | 12/2020 | Silversides | H04L 41/0806 |
| 11,372,828 | B1* | 6/2022 | Bendapudi | G06F 16/258 |
| 2003/0058280 | A1* | 3/2003 | Molinari | G01R 13/345 715/771 |
| 2003/0115586 | A1* | 6/2003 | Lejouan | H04L 41/046 725/20 |
| 2005/0216497 | A1* | 9/2005 | Kruse | G06Q 10/00 |
| 2005/0234969 | A1* | 10/2005 | Mamou | G06F 16/254 707/999.102 |
| 2005/0273315 | A1* | 12/2005 | Laitila | G06F 40/30 704/9 |
| 2006/0161444 | A1* | 7/2006 | Lubrecht | G06Q 10/06395 705/7.41 |
| 2006/0161879 | A1* | 7/2006 | Lubrecht | G06Q 10/06 717/101 |
| 2006/0212487 | A1* | 9/2006 | Kennis | G06Q 40/00 |
| 2007/0027905 | A1* | 2/2007 | Warren | G06F 16/2452 |
| 2007/0106768 | A1* | 5/2007 | Frietsch | H04L 41/12 709/223 |
| 2007/0169027 | A1* | 7/2007 | Drepper | G06F 8/71 717/174 |
| 2007/0178501 | A1* | 8/2007 | Rabinowitz | G16H 70/00 435/6.16 |
| 2008/0071403 | A1* | 3/2008 | Conway | C30B 1/02 700/97 |
| 2008/0098099 | A1* | 4/2008 | Khasnis | G06F 8/61 709/222 |
| 2008/0163165 | A1* | 7/2008 | Shitrit | G06F 11/3688 717/107 |
| 2008/0300855 | A1* | 12/2008 | Alibaig | G10L 13/00 704/3 |
| 2010/0030726 | A1* | 2/2010 | Chandrasekar | G06F 16/81 707/715 |
| 2011/0173235 | A1* | 7/2011 | Aman | G06V 40/23 707/E17.055 |
| 2011/0191380 | A1* | 8/2011 | Karnam | H04W 4/14 707/E17.055 |
| 2011/0307242 | A1* | 12/2011 | Alibaig | G10L 13/00 704/3 |
| 2012/0072386 | A1* | 3/2012 | Willems | G06N 5/04 706/47 |
| 2012/0259809 | A1* | 10/2012 | Hermann | G06F 16/254 707/600 |
| 2013/0060803 | A1* | 3/2013 | Maman | G06F 16/2452 707/E17.014 |
| 2013/0133059 | A1* | 5/2013 | Maman | H04L 63/0823 726/12 |
| 2013/0145342 | A1* | 6/2013 | Wason | G06F 8/71 717/100 |
| 2013/0238379 | A1* | 9/2013 | Prieto | G06Q 50/08 705/7.23 |
| 2013/0238642 | A1* | 9/2013 | Clayton | G16Z 99/00 707/756 |
| 2013/0297216 | A1* | 11/2013 | Hirst | G16Z 99/00 702/19 |
| 2013/0304724 | A1 | 11/2013 | Rosjat et al. | |
| 2014/0372964 | A1* | 12/2014 | Wason | G06F 8/71 717/100 |
| 2015/0052157 | A1* | 2/2015 | Thompson | G06F 16/335 707/754 |
| 2015/0213129 | A1* | 7/2015 | Pingree | G06F 16/951 707/769 |
| 2016/0149654 | A1* | 5/2016 | Whitby-Strevens | H04B 17/21 375/224 |
| 2016/0321279 | A1* | 11/2016 | Ishijima | G06F 3/1245 |
| 2017/0068891 | A1* | 3/2017 | Shironoshita | G06F 40/30 |
| 2017/0235848 | A1* | 8/2017 | Van Dusen | G06Q 10/101 705/12 |
| 2017/0372068 | A1* | 12/2017 | Zimmerman | G06F 21/577 |
| 2018/0067987 | A1* | 3/2018 | Kang | G06F 16/2443 |
| 2020/0133651 | A1* | 4/2020 | Holzer | G06F 8/65 |

OTHER PUBLICATIONS

M.A. Ismail et al., "Integration of heterogeneous relational databases: RDF mapping approach," 2008 International Symposium on Information Technology (ITSIM 2008), Sep. 2008, 8 pages.

Anonymous, "Staging (data)," Retrieved from the Internet: URL: L:https://en.wikipedia.org/w/index.php?title=Staging(data)&oldid=788912838, Jul. 4, 2017, 3 pages.

International Search Report and Written Opinion for International Patent Application No. PCT/US2018/046403, dated Oct. 18, 2018, 11 pages.

* cited by examiner

| Database Lists | Databases | Details | |
|---|---|---|---|
| [New] [Delete] | [New] [Delete] | ID: | 2 |
| | | Owner List ID | 2 |
| CRM | ▶ Mgt Rptg Data | Name | Mgt Rptg Data |
| Evaluations | | Server | 111.222.33.44 |
| HRIS | | DB Name | MANAGEMENT_REPORTING |
| Learning Managment | | Collation | SQL_Latin1_General_CP1_CI_AS ▼ |
| ▶ Management Reporting | | Login | ******** |
| Spreadsheets | | Password | ******** |
| Weblogs | | Connection Timeout | 30 |

[Test Connection]    406
[Check Usage]

Currently, Mgt Rptg Data is being used by the following database connection lists:
    Management Reporting
Connection successful.

| Companies | Users | Details | | | | | |
|---|---|---|---|---|---|---|---|
| (New) (Delete) | (New) (Delete) | ID: | 6 | ☒ Active | Password | | (Update) |
| ABC Client Company | Amy Able | UserName | ZBSUP | | | | |
| F103 | William Baker | Full Name | Soup R. User | | | | |
| ▶ LawFIrm | Donald Doe | First | Soup | | | | |
| | James Jones | Middle | R. | | | | |
| | Patricia Peters | Last | User | | | | |
| | Samuel Smith | Gender | UNK | | | | |
| | ▶ Soup R. User | TKID | 99999 | Default Application | Reporting ▼ | | |
| | | Base Date | | Default Persona | Firm Manager ▼ | | |
| | | Lockout After # Attempts | | | | | |
| | | ☐ Account Locked | | | (Set) | | 506 |

User Role Assignment

| | | |
|---|---|---|
| ABC Client | | ▶ Super |
| ClientMgr | ≫ | |
| CompACCChair | ≪ | |
| CompAdmin | | |
| ▶ CompEPCCChair | | |
| CompEPCCMember | | |
| CompIPCCChair | | |
| CompIPCCMember | | |
| PGMgr | | |
| Firm Manager | | |

| Applications | Objects | Properties | Application Details | Object Details | Property Details |
|---|---|---|---|---|---|
| New  Delete | New  Delete | New  Delete | Selected Application's Settings | | |
| | | | ID: 6 | | 708 |
| Compensation | Account | BillAttyTkNum | Name: Reporting | | |
| HRIS | AccountGroup | ClientNum | Label: | | |
| Profitability | Client | CliMat | Comments: | | |
| ▶ Reporting | Department | ▶ MatStatus | | | |
| Spreadsheets | MatStatus | MatterNum | ☒ Active | | Force Refresh |
| | ▶ Matter | Name | Run Wizard  Import Spreadsheet  Drop Sync & Reset | | |
| | Office | RespAttyTkNum | | | |
| | OfficeGroup | | Persona | | |
| | PracticeGroup | | Available Persona | | Persona Assigned |
| | | | ▶ Assoc Comp | >> | Firm Manager |
| | | | Income Ptr Comp | | ▶ Pract Grp Manager |
| | | | Equity Ptr Comp | << | ABC Client |
| | | | Client Manager | | |

| Applications | Objects | Properties | Application Details | Object Details | Property Details |
|---|---|---|---|---|---|
| (New) (Delete) | (New) (Delete) | (New) (Delete) | Selected Objects Settings | | |
| | | | ID: 91 | | |
| Compensation | Account | BillAttyTkNum | Name: Matter | | |
| HRIS | AccountGroup | ClientNum | Label: Matter | | |
| Profitability | Client | CliMat | Comments: | | |
| ▶ Reporting | Department | ▶ MatStatus | | | |
| Spreadsheets | MatStatus | MatterNum | DB Conn. List: Management Reporting ▼ | | |
| | ▶ Matter | Name | Update Opt.: Minute ▼ | | |
| | Office | RespAttyTkNum | Update Order: 5  (Force Refresh) | | |
| | OfficeGroup | | ☐ Schema Only  (Force Drop & Rebuild)  708 | | |
| | PracticeGroup | | ☒ Is Active | | |
| | Production | | Prefix: MAT | | |
| | RankLevel1 | | Source DBs | | |
| | RankLevel2 | | ▶ Mgt Rptg Data | | |
| | RankTitle | | | | |
| | Rates | | | | |
| | Timekeeper | | | | |

| Applications | Objects | Properties | Application Details | Object Details | Property Details |
|---|---|---|---|---|---|
| New Delete | New Delete | New Delete | Selected Property's Settings | | |
| | | | ID: 518 | | 708 |
| Compensation | Account | BillAttyTkNum | Name: MatStatus | | |
| HRIS | AccountGroup | ClientNum | Label: MatStatus | | |
| Profitability | Client | CliMat | Comments: | | |
| ▶ Reporting | Department | ▶ MatStatus | SQL Data Type: Int | | |
| Spreadsheets | MatStatus | MatterNum | Characteristics: Functional ▼ | | |
| | ▶ Matter | Name | ☐ Is Sub Class  Display Order 3 | | |
| | Office | RespAttyTkNum | ☐ Is Primary Key | | |
| | OfficeGroup | | ☒ Is Foreign Key  ☐ Visible To User | | |
| | PracticeGroup | | FK Object MatStatus ▼  ☒ User Editable | | |
| | Production | | ☐ Is AutoGenerated | | |
| | RankLevel1 | | FK Property ID ▼ | | |
| | RankLevel2 | | | | |
| | RankTitle | | Validation | Data Description | |
| | Rates | | | | New Delete |
| | Timekeeper | | Name | | |
| | | | Script | | |
| | | | Valid. State | ▼ | |
| | | | FixedData | | |
| | | | Apply Order | | |

METHOD AND APPARATUS FOR THE CONVERSION AND DISPLAY OF DATA

CROSS-REFERENCE TO RELATED APPLICATION

The instant application is a continuation of U.S. application Ser. No. 17/474,401, entitled "METHOD AND APPARATUS FOR THE CONVERSION AND DISPLAY OF DATA" and filed Sep. 14, 2021, which is a continuation of U.S. application Ser. No. 16/101,491, now U.S. Pat. No. 11,144,583, entitled "METHOD AND APPARATUS FOR THE CONVERSION AND DISPLAY OF DATA" and filed Aug. 12, 2018, which claims the benefit of Provisional U.S. Patent Application Ser. No. 62/544,819, entitled "COMPUTER-BASED METHOD AND DEVICE FOR GENERATION OF ONTOLOGICAL DATA" and filed Aug. 12, 2017, the teachings of each of which are incorporated herein by this reference and relied upon.

FIELD

The instant disclosure relates generally to management of enterprise data and, m particular, to the conversion and display of such data.

BACKGROUND

Various types of enterprises, such as businesses or other organizations, are typically created. In the process of operating, such enterprises typically generate substantial quantities of data. Effective management of such enterprises is based in part on the ability to develop insights from such data. While the data necessary to develop such insights may exist, the sheer quantity, complexity and variability of such data makes it difficult to exploit this potential resource. Exacerbating this situation is the fact that such data is often provided by disparate sources that interoperate poorly, if at all, and that such data is frequently stored in formats, e.g., spreadsheets, that make it difficult to efficiently gather, organize and present the data.

While it is known to create software-based solutions to address these problems, such solutions are typically expensive to implement and are often custom-tailored integration of an enterprise's information systems as they exist at the time the solution is created. As a result, changes to information systems require corresponding changes to the data management solution that are not trivial to implement.

Thus, it would be advantageous to provide a solution that overcomes these shortcomings in the art.

SUMMARY

The instant disclosure describes techniques for the conversion and display of enterprise data that overcomes many of the limitations of prior art solutions. In particular, a system is provided comprising one or more computer-implemented components that facilitate the conversion of data from various data sources to a semantic data representation such that the resulting semantic data may be presented via highly configurable user interfaces. In an embodiment, a computer-implemented configuration workstation is provided that generates configuration tables representative of applications that each comprise one or more object data structures. Each of the object data structures are linked to one or more staging databases that, in turn, obtain data from one or more standalone data sources. Further, each of the object data structures comprises at least one property that defines available data for the object data structure in the at least one staging database. The resulting configuration tables are provided to a computer-based controller that, from time to time, obtains data from the staging database(s) in accordance with the configuration tables. The controller also causes the obtained data to be converted to the semantic data format and stored in a semantic database. Thereafter, a computer-based web server, obtains requested semantic data from the semantic database for at least some of the object data structures for an application. The web server then generates a user interface based on the requested semantic data and provides it to a user device for display.

In an embodiment, the definition of properties for each object data structure include data validation criteria. When data is extracted from a given standalone data source, it is validated according to the data validation criteria prior to storage in one or more of the staging databases. Furthermore, in an embodiment, to the extent the configuration tables can be updated as desired (for example, to reflect the addition or removal of various data sources), the controller will validate data relationships reflected in the existing semantic data before translation and storage of data obtained from the staging databases. In yet another embodiment, for the sake of efficiency, when translating data, the controller will first identify data in the at least one staging database that that has been modified (e.g., added, changed or deleted) and thereafter only perform translations on data that has been modified.

In one embodiment, various personas are defined and assigned to each application during generation of the configuration tables. In turn, each persona has one or more authorized user roles associated therewith. When obtaining requested semantic data for the generation of a user interface, the web server will determine any assigned role for a given user. To the extent that a user's assigned role matches the personas for a given application, the web browser will obtain the requested semantic data based on the user's assigned role(s), thereby ensure that only data appropriate for that user is presented. The user interfaces generated by the web server are based on the various available object data structures defined across the available applications. To the extent that the user interface is thus permitted to be defined according any available object data structure, insights into an enterprise's available data are more readily achieved.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIG. 4 is an example data entry user interface for the configuration of staging databases based on standalone data sources in accordance with the instant disclosure;

FIG. 5 is an example data entry user interface for the configuration of users and assigned roles in accordance with the instant disclosure;

FIGS. 7-9 are example data entry user interfaces for the configuration of applications, object data structures and their corresponding properties in accordance with the instant disclosure;

DETAILED DESCRIPTION OF THE PRESENT EMBODIMENTS

Figure 1:
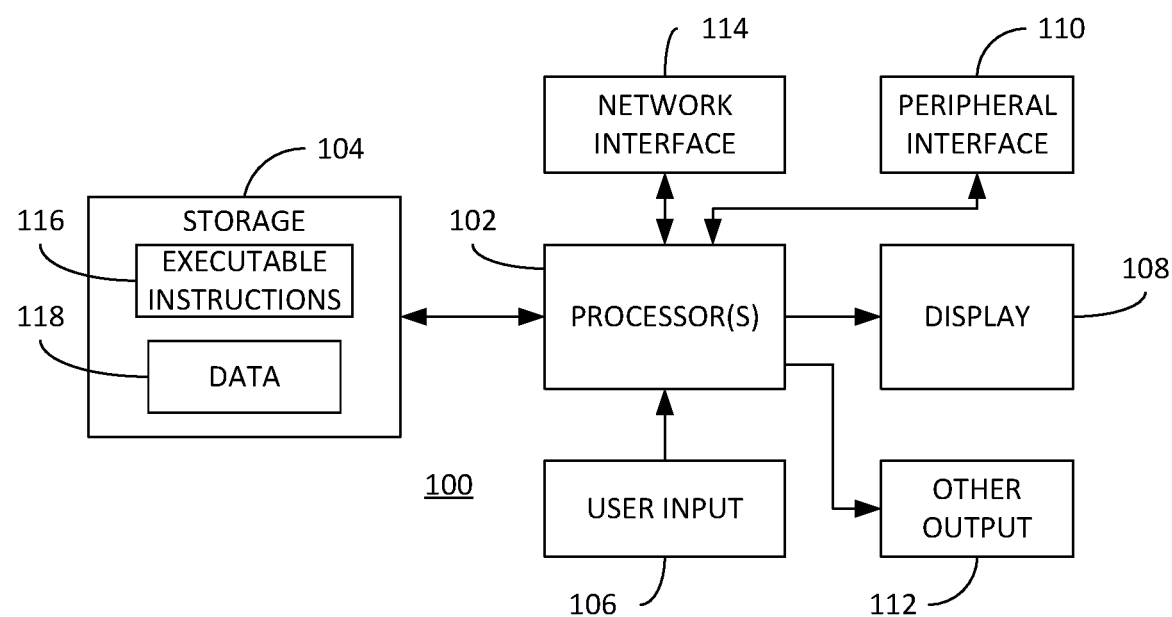
FIG. 1 is a block diagram of an example processing device that may be used to implement various aspects of the instant disclosure.

FIG. 1 illustrates a representative processing device 100 that may be used to implement the teachings of the instant disclosure. The device 100 may be used to implement, for example, one or more components of the system 200, as described in greater detail below. Regardless, the processing device 100 comprises a processor 102 coupled to a machine-readable storage device 104. The storage device 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage device 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, database and corresponding database management system (DBMS), etc. Processor and storage arrangements of the types illustrated in FIG. 1 are well known to those having ordinary skill in the art. In one embodiment, the processing techniques described herein are implemented as a combination of executable instructions and data within the storage devices 104 of one or more processing devices 100.

As shown, the processing device 100 may comprise one or more user input devices 106, a display 108, a peripheral interface 110, other output devices 112 and a network interface 114 in communication with the processor 102. Though the one or more user input devices 106, display 108, peripheral interface 110, other output devices 112 and the network interface 114 are illustrated as being separately connected to or in communication with the processor 102, those having skill in the art will appreciate that the illustrated connections can be implemented by one or more communication busses and, further, that such busses may permit communication between the various components 104-114. The user input device 106 may comprise any mechanism for providing user input (such as inputs described below) to the processor 102. For example, the user input device 106 may comprise a keyboard, a mouse, a touch screen (as part of the display 108), microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 316, may be used to implement a graphical user interface. Generally, implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices (scanners, barcode readers, etc.) or any other input source (including other, similar processing devices) used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single processing device 100 is illustrated in FIG. 1, it is understood that a combination of such processing devices may be configured to operate in conjunction (for example, using known networking techniques) to implement the teachings of the instant disclosure.

Figure 2:
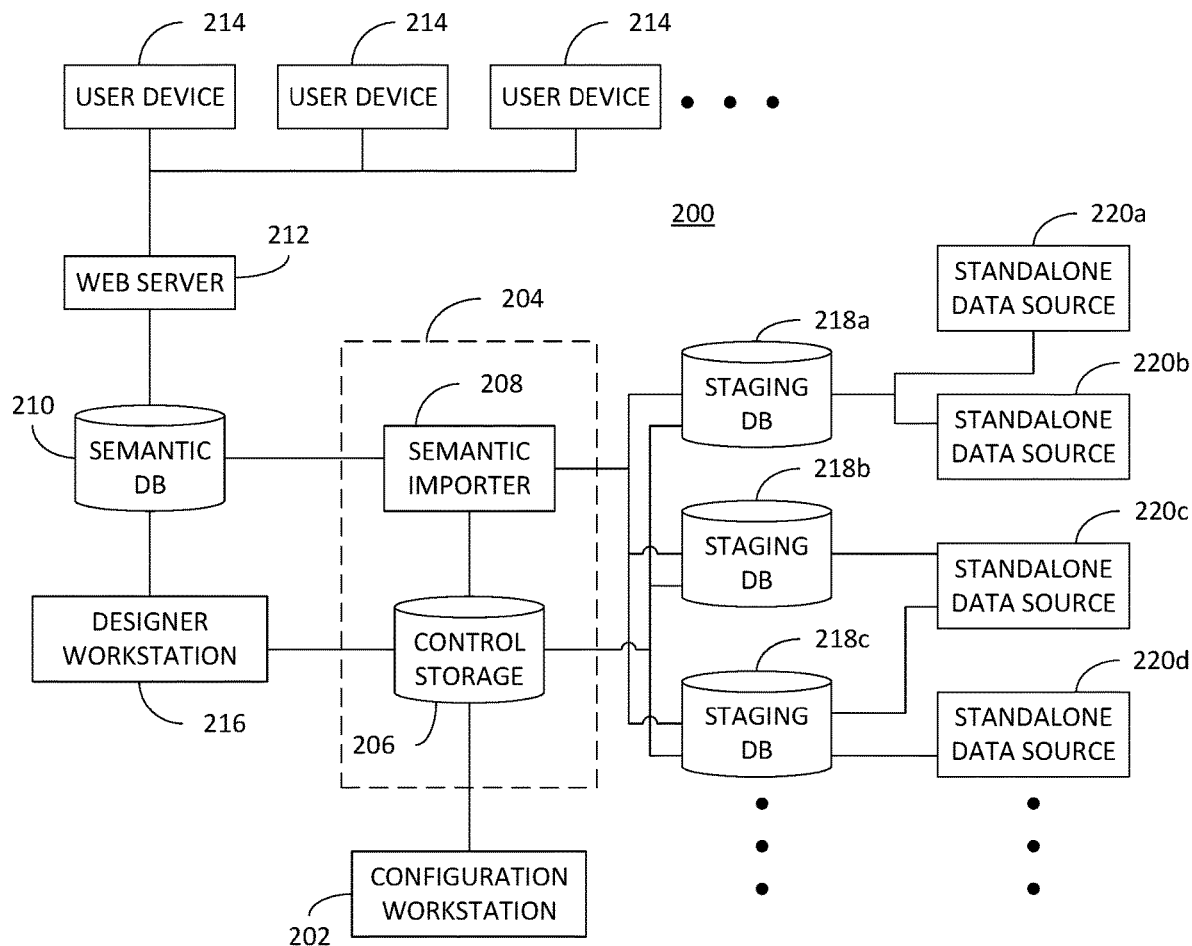
FIG. 2 is a block diagram of a system in accordance with the instant disclosure.

Referring now to FIG. 2, a system 200 in accordance with the instant disclosure is illustrated. In particular, the system 200 comprises a configuration workstation 202 operatively connected to a controller 204 that comprise a control or configuration storage 206 and a semantic importer 208. The controller 204, via the semantic importer 208, is operatively connected to a semantic database 210 and one or more staging databases 218. The controller 204 is further operatively connected to the staging databases 218, and to a designer workstation 216, via the control storage 206. The staging databases 218 are each operatively connected to one or more standalone data sources 220. The semantic database 210 is operatively connected to the designer workstation 216 and a web server 212 that, in turn, is operatively connected to one or more user devices 214. As noted above, each of the components 220-220 illustrated in system 200 may be implemented using one or more processing devices 100, or portions thereof, as illustrated in FIG. 1.

In an embodiment, the configuration workstation 202 provides functionality that allows an administrative user to define applications, as described in further detail below, used to manage data according to specific functions applicable to an enterprise. For example, in the context of a law firm, major functions contributing to the operation of the law firm might include client relationship management (CRM), human resources, compensation committee operation, timekeeping, associate evaluations, etc. (It is noted that the law firm example of an enterprise is used throughout this description for description purposes only. It is emphasized that this is a non-limiting example of the myriad types of enterprises that may benefit from the technologies described herein.) Each of these functions will typically have operational systems designed to specifically support that function (e.g., a CRM system or time entry system). However, it is nevertheless true that insights into the operational state of the law firm requires an understanding of all of these functions as whole, not just individually. That is, understanding is best fostered when all of the data most relevant to law firm's various functions is presented in a cohesive, rather than siloed, manner. Based on the defined applications, the configuration workstation generates configurations tables, such as Structured Query Language (SQL) tables as known in the art, that inherently capture an ontology, or description of the relationships between various pieces of data, most relevant to a given application. Once created, the configuration tables are provided to the controller 204, specifically the control or configuration storage 206. In an embodiment, the control storage 206 may be implemented using a relational database and corresponding relational DBMS, or by using a semantic database, as known in the art.

The configuration tables determine when operation of the semantic importer 208 is invoked. For example, in an embodiment, the semantic importer may be implemented as a Windows service that is continuously available and that initiates translations at user intervals (set by an administrative user of the configuration workstation) when, in an embodiment, modified data requiring translation is available. The semantic importer 208 performs a translation of the data available in the various staging databases 218 into a semantic data format. For example, the semantic data format may be implemented as so-called triples in accordance with the well-known Resource Description Framework (RDF), Resource Description Framework Schema (RDFS), and Web Ontology Language (OWL). Such triples are statements about data in the form of subject-predicate-object where the subject denotes a resource (or data), the predicate sets forth characteristics about the subject and expresses a relationship between the subject and the object. For example, in triples format, the statements "Chris is an attorney" and "attorneys work in buildings" could be formed as "x:Chris-y:isA-z:attorney" and "x:attorneys-y:workIn-z:building," where, as known in the art, x, y and z are locators (e.g., Uniform Resource Identifiers (URI)) to information that uniquely name entities (e.g., "is a" and "building"). As further known in the art, this storage format not only captures the relevant data, but also captures information concerning relationships between the data, sometimes referred to an ontology. In this example, the fact that "Chris" has the characteristic of "attorney" and that "attorneys" have a relationship to "buildings" makes it possible to infer that "Chris" has the denoted relationship with "buildings," i.e., he works in one.

As further know in the art, the structural information embodied in relational database tables may be used to transform data in relational tables into a semantic data format such as RDF triples. In general, conversions into the triples storage format are based on identifying the most primitive or fundamental data structure in the source database storage format and mapping those data structures to triples. Thus, for example, when converting from a relational database storage format, the conversion process can iterate through each table and, for each row, establish a triple in which the predicate is fixed to "is type [table name]." Thereafter describing foreign key relationships m the form of triples, e.g., "x:row_object y:has_other_object_name 'other_object_PK_value'." Within each table, the conversion process also iterates through each column. Each column is represented as belonging to the row_object, "x:row_object y:has_column_name 'value'." Likewise, the conversion process iterates through each row with each cell within the row becoming its own triple. Those having skill in the art will appreciate that other known techniques for such transformations, or improvements thereon, may be equally employed herein without loss of generality.

The staging database(s) 218 may be implemented as relational databases that implement tables based on the schemas established in the configuration tables in the control storage 206. As described in greater detail below, applications are defined according to object data structures (not to confused with the concept of an "object" defining a triple statement) having one or more properties. In essence, object data structures capture relationships between data, in relational table form, which data is represented by the corresponding properties. Thus, when administrative users of the configuration workstation 202 define such object data structures, they are inherently capturing ontological information that may be used to generate user interface displays that facilitate improved contextual understanding of the underlying data. To the extent that a given object data structure may be defined according to data that is available in different ones of the staging databases 218, more than one of the staging databases 218 may include a table representative of a given object data structure.

As further shown, the staging database(s) 218 extract data from one or more standalone data sources 220. As described below, the configuration tables include information designating where specific data for an object data structure may be found in the standalone data source(s) 220. As used herein, the term "standalone" refers to the characteristic of a given data source that the data it generates is generally only available to that data source. For example, data about timekeeping in a law firm (attorneys) may exist in a time entry system, but may not be otherwise readily available to other systems, e.g., a human resource. Generally, each standalone data source 220 will have a corresponding data store and techniques for transferring data from such data stores into relational databases (such as the staging database(s) 218) are known in the art. Alternatively, a data source 218 may comprise data made available in a particular representational format stored in a known location, e.g., data in a spreadsheet. In an embodiment, data is extracted from the standalone data sources 220 on a periodic or on-demand basis, or it may be provided to the staging databases 218 independent of the scheduled times. As further illustrated in FIG. 2, each staging database 218 may obtain underlying data from one more of the standalone data sources 220. For example, a first staging database 218a may obtain data from only first and second standalone data sources 220a, 220b. On the other hand, a second staging database 218b obtains data only from a third standalone data source 218, whereas a third staging database 218c obtains data from both the third standalone data source 220c and a fourth standalone data source 220d.

The semantic database 210 may comprise a suitable, triples- and/or RDF/RDFS/OWL-compatible database. Such databases are available from MarkLogic Corporation of San Carlos, California, or other vendors known to those skilled in the art. As described above, the semantic database 210 acts as a central repository for all data translated by the semantic importer 208, thereby simplifying access to such data. The designer workstation 216 implements a suitable user interface design platform, such as those available from Developers Express Inc. of Glendale, California. As described below, the designer workstation 216 can obtain information about all of the available object data structures represented in the configuration tables of the control storage 206. Using the capabilities of such user interface design platforms, the designer workstation 216 allows an interface designer to develop dashboards that incorporate data pertaining to the various object data structures, thereby facilitating unified presentations of previously disparate data, an example of which is described below.

As further shown in FIG. 2, the web server 216 is operatively connected to the semantic database 210. In an embodiment, the web server 216 may be implemented using well-known web server technologies. As known in the art, the web server 212 services requests from one or more user devices 214 to access the data stored in the semantic database 210. The user devices 214 may comprise any suitable processing device capable of communicating with the web server 212. For example, the user devices 214 may comprise desktop/laptop/tablet computers or Internet-capable mobile phones, and techniques for network communications (e.g., wired or wireless networks) between such devices and the web server 212 are well known in the art. In an embodiment, the web server 212 operates to validate users of the system 200, obtain information concerning dashboards available to a given user and obtain the semantic data used to form the user interfaces/dashboards, as described in further detail below.

Figure 11:
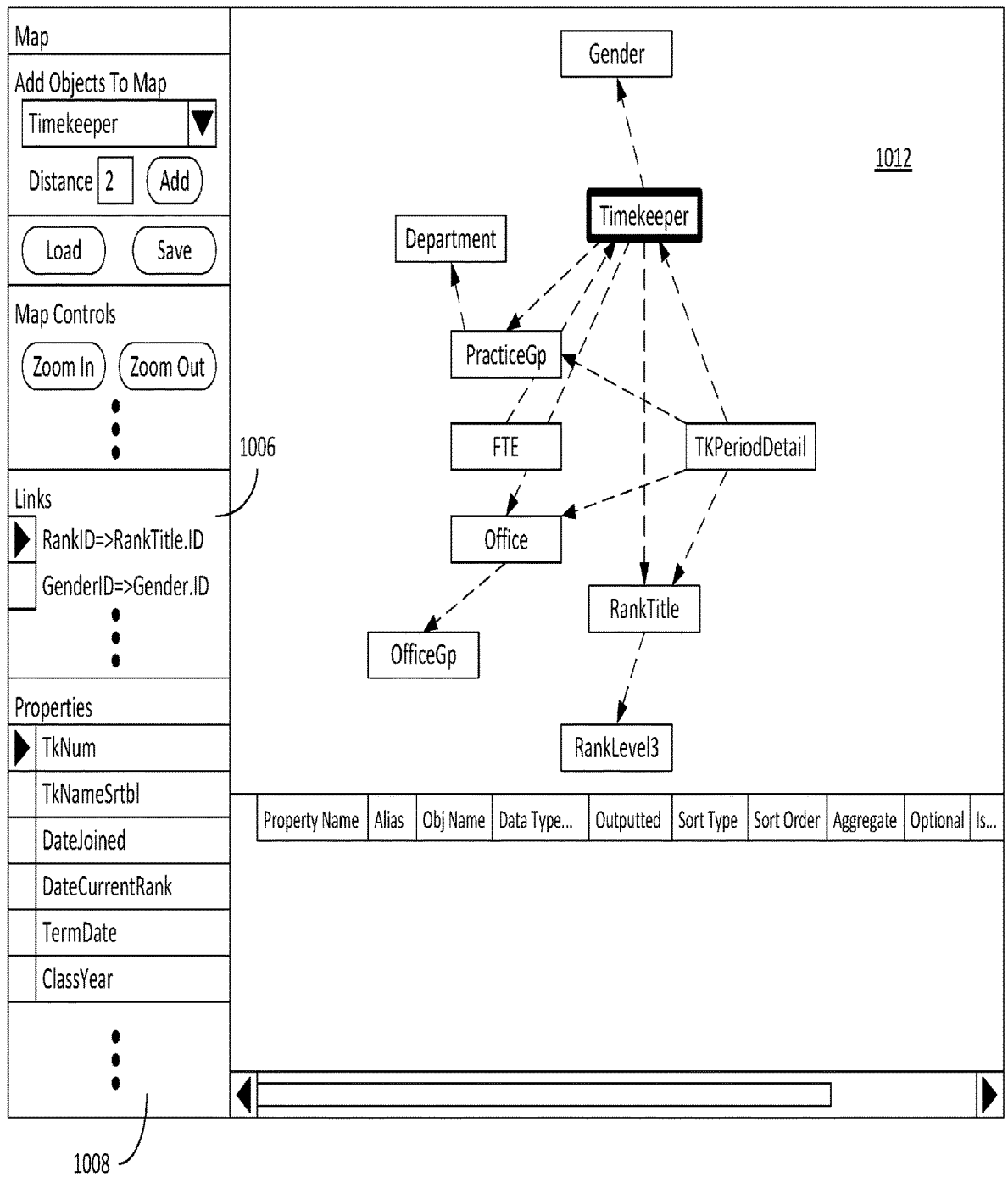
Figure 12:
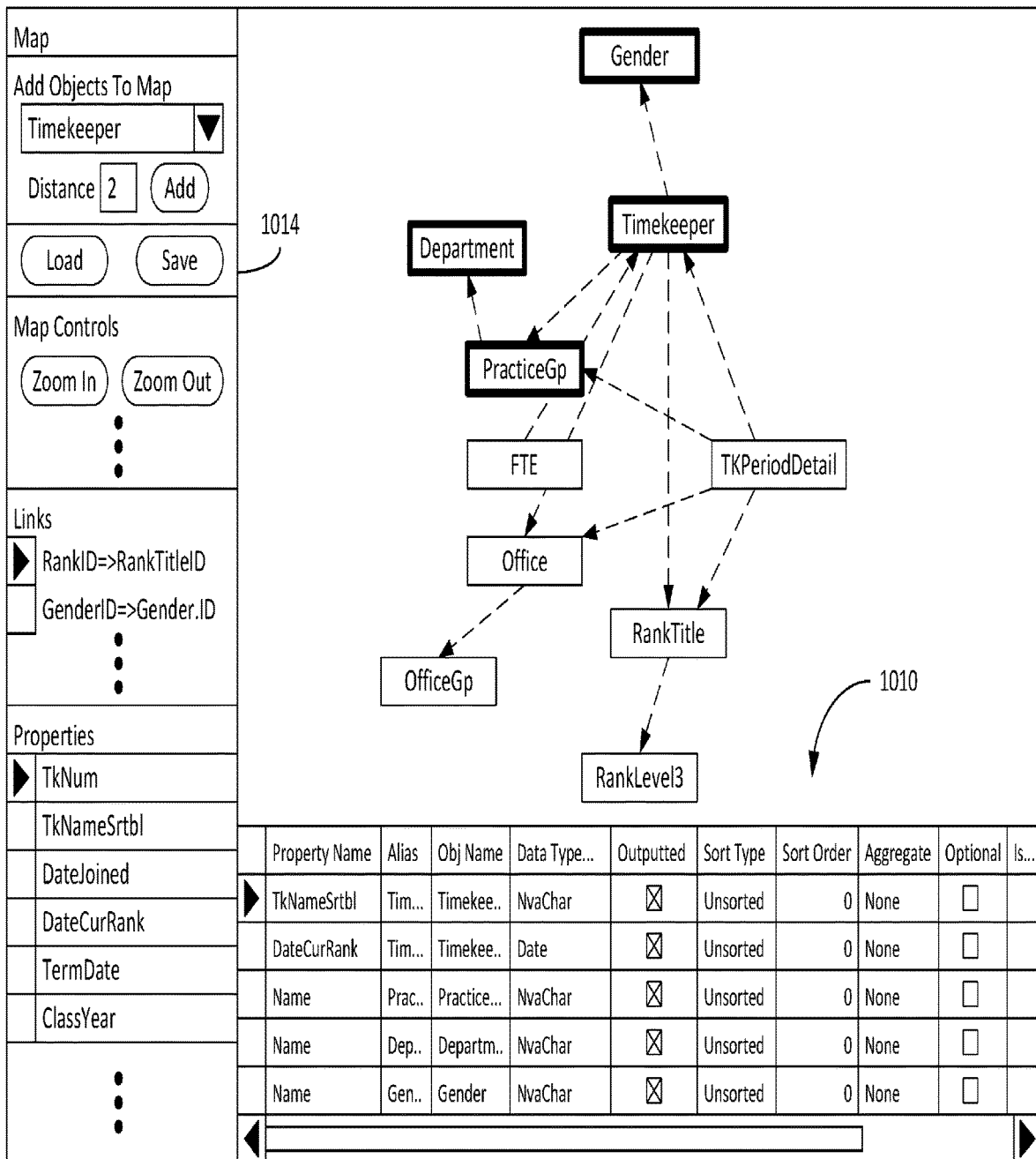
Figure 13:
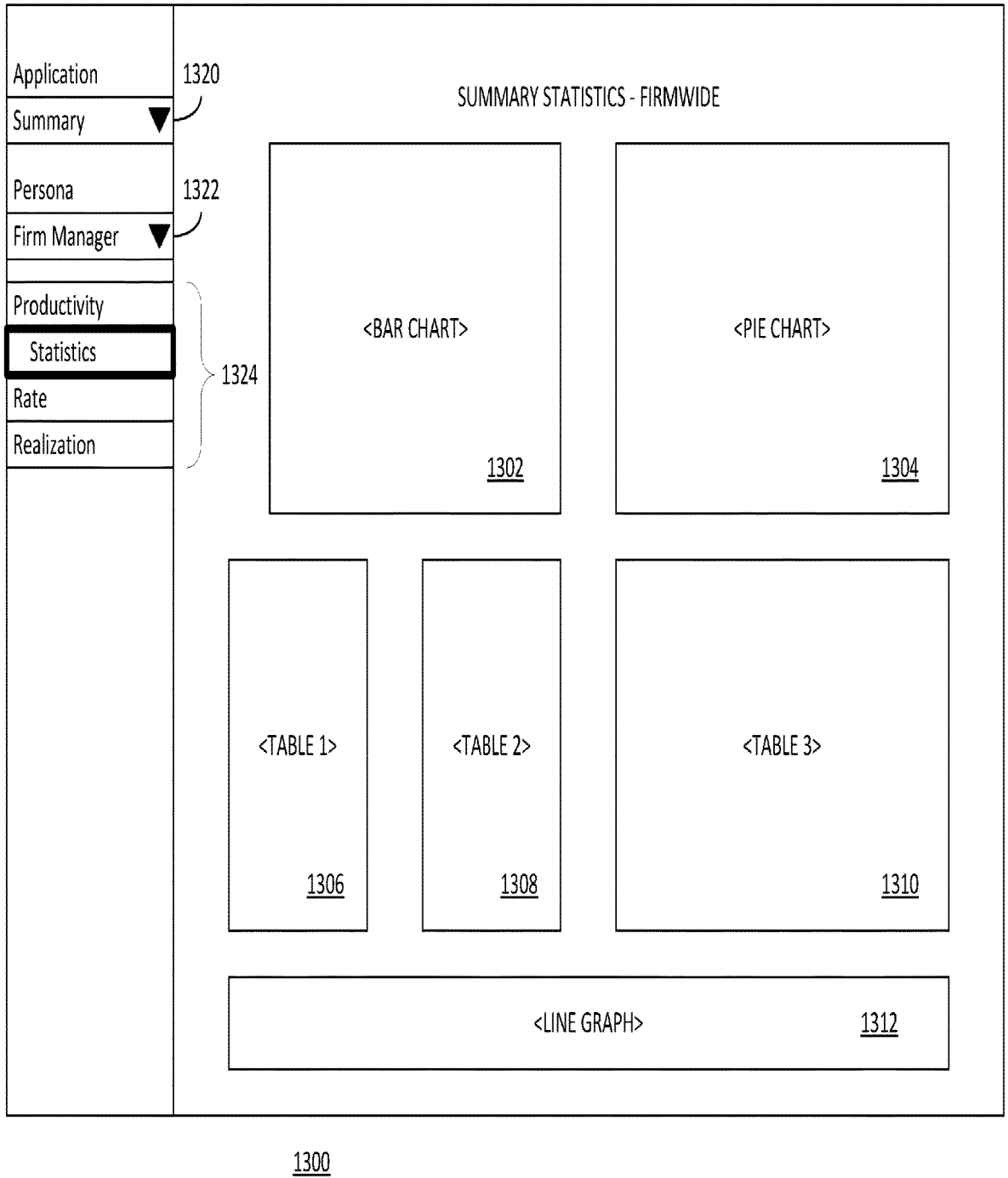
FIG. 13 is an example user interface for displaying data in accordance with the instant disclosure.

Operation of the system 200 will now be described with further reference to FIGS. 3-13. In particular, FIGS. 3A-3C illustrate processing performed by various ones of the components illustrated in FIG. 2, whereas FIGS. 4-12 illustrate user interfaces implemented by those components to provide the described processing and FIG. 13 illustrates an example of a user interface/dashboard.

Figure 3A:
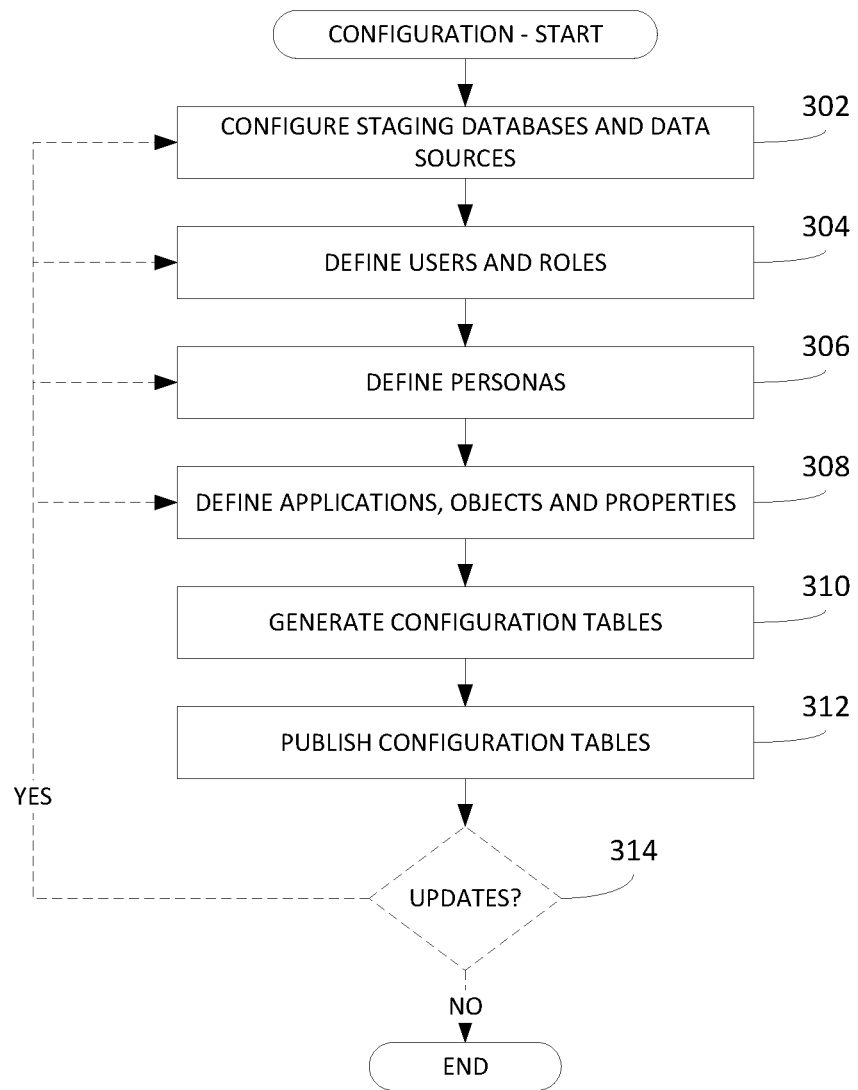
FIG. 3A is a flowchart illustrating operation of a configuration workstation in accordance with the instant disclosure.
Figure 3B:
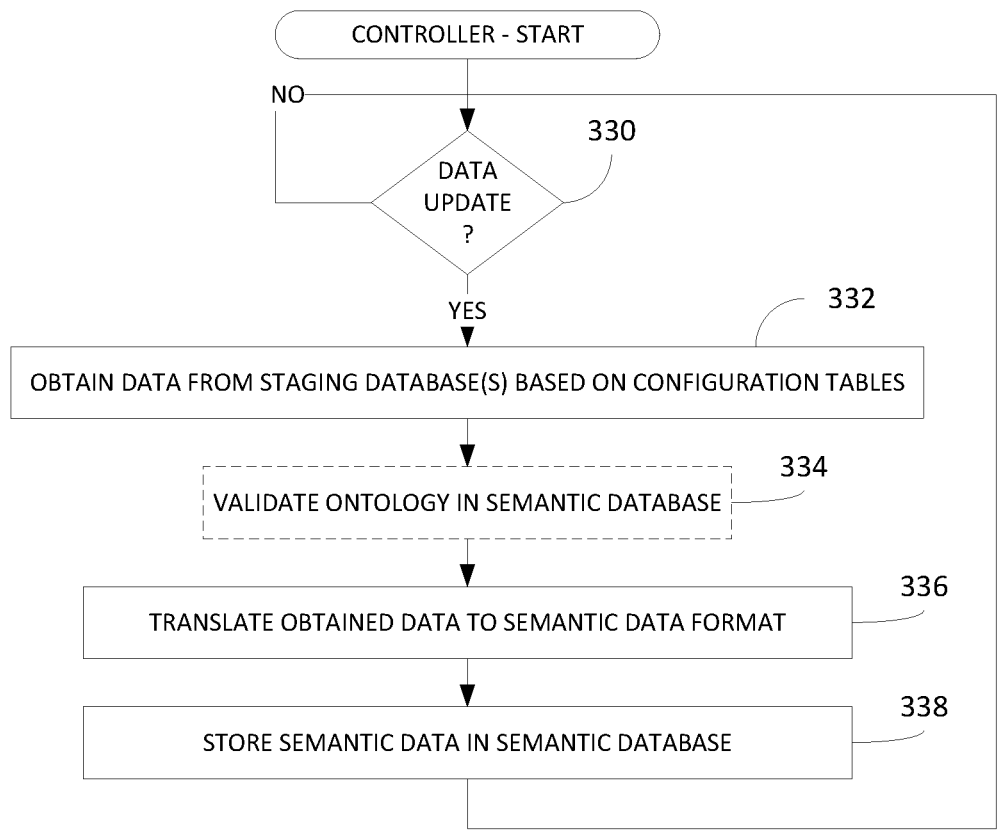
FIG. 3B is a flowchart illustrating operation of a controller in accordance with the instant disclosure.
Figure 3C:
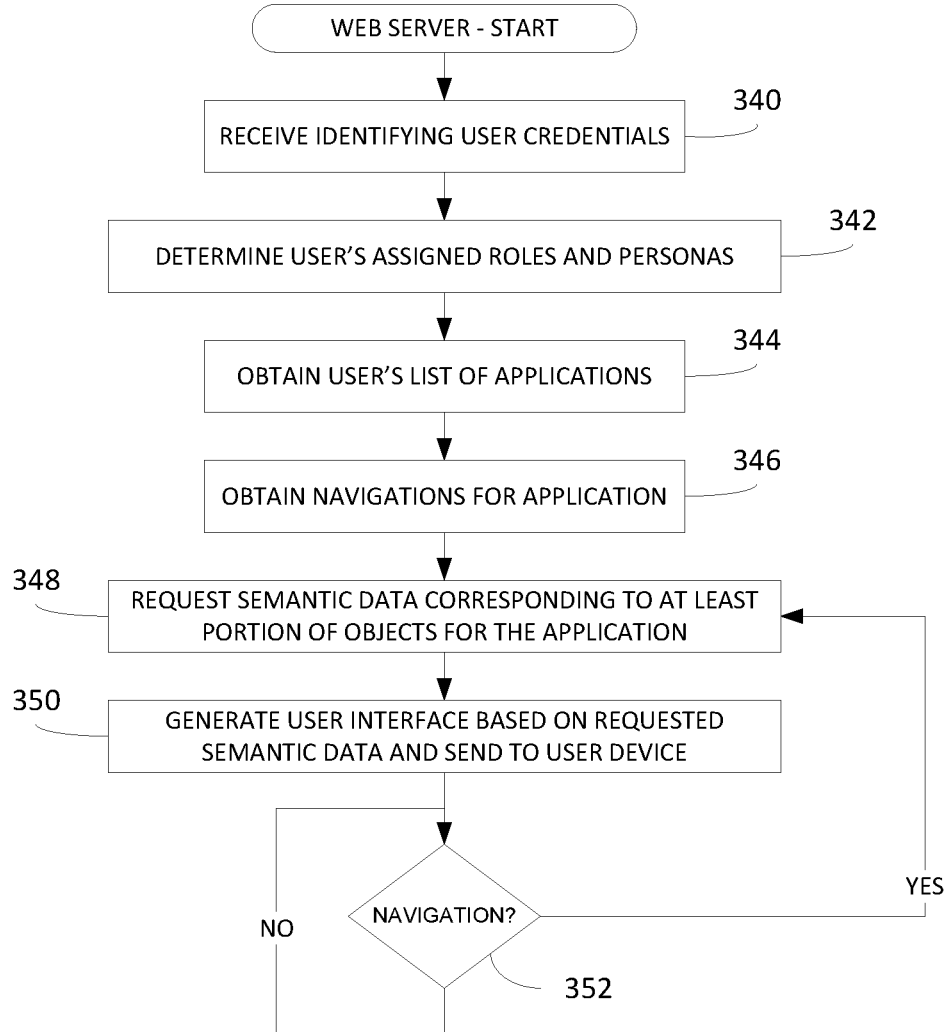
FIG. 3C is a flowchart illustrating operation of a web server in accordance with the instant disclosure.
Figure 6:
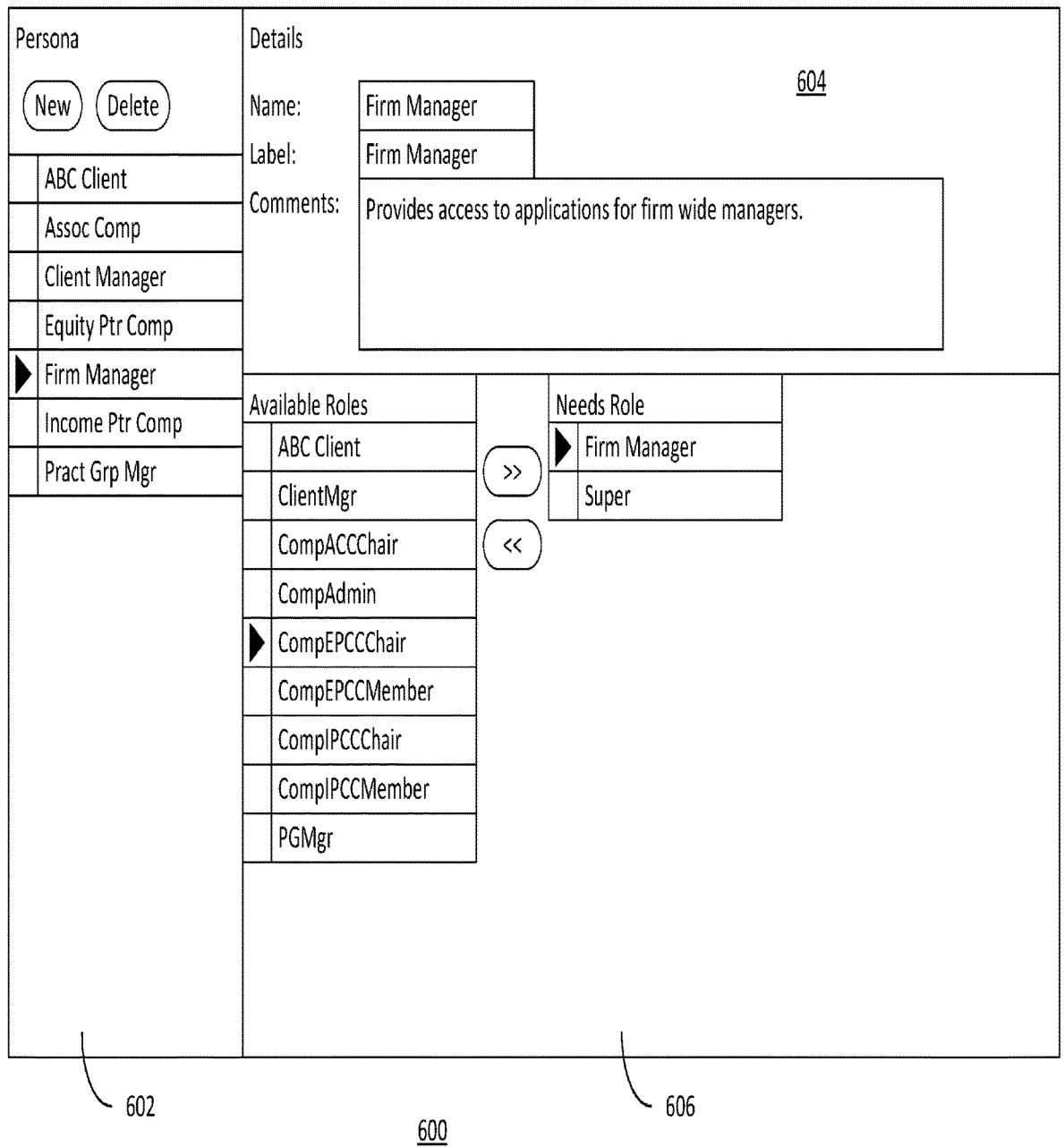
FIG. 6 is an example data entry user interface for the configuration of personas according to roles in accordance with the instant disclosure.

With reference now to FIG. 3A, processing performed by the configuration workstation 202 is illustrated. Beginning at block 302, the configuration workstation, using a suitable user interface, operates to obtain data used to configure staging databases and standalone data sources. An example of such a user interface 400 is illustrated with respect to FIG. 4. In an embodiment, the user interface 400 (as well as the other user interfaces implemented by the configuration workstation, described below) may be created in Microsoft Visual Studio using Developer Express controls, and database first Entity Framework by Microsoft Corporation to provide the data base operations. Other implementation techniques, also well known in the art, may be alternatively employed. As further known in the art, as data is entered into the user interfaces described herein, it is automatically saved.

As shown, the user interface 400 comprises a staging database definition panel 402, a standalone data source (or database) definition panel 404, a standalone data source details entry panel 406 and a status panel 408. As shown in the staging database definition panel 402, controls (buttons) are provided to create a definition of a new staging database or delete an existing definition of a staging databases. In the illustrated example, seven staging databases have been provided, entitled: CRM, Evaluations, HRIS, Learning Management, Management Reporting, Spreadsheets and Weblogs. Input boxes are provided next to each staging database allowing selection of the corresponding staging database; in the illustrated example, the Management Reporting staging database has been selected. The standalone data source definition panel 404, in turn, provides controls that permit the establishment or deletion of a relationship between the selected staging database and a standalone data source. In the illustrated example, by selecting the "New" button in the standalone data source definition panel 404, a user is presented with the standalone data source details entry panel 406. In the details entry panel 406, various fields are provided that allow the user to enter data that associates the selected staging database with a standalone data source. Thus, the user is able to enter data specifically identifying the standalone data source, i.e., Owner List ID, Name, Server (in the form of an Internet Protocol (IP) address) and database name. Fields for the entry of further information about operation of the identified standalone data source are also provided, i.e., a control in the form of dropdown menu for specifying collation of the data source, fields for entry of a login ID and password to access the data source, as well as a connection time out entry field. A "Test Connection" button is provided that, when selected, causes the configuration workstation to test the connection between the staging database and the designated standalone data source in accordance with known techniques. Finally, a "Check Usage" button is provided that, when selected, determines what staging databases, if any, the currently defined standalone data source is further associated with. This is useful when deciding whether to delete a particular standalone data source from the system in order to ensure that other associations are not unintentionally removed. In the illustrated example, the status panel 408 shows the results according to the selected "Test Connection" and "Check Usage" buttons where it indicates that the association between the staging database (e.g., Management Reporting Data) and the indicated standalone data source (e.g., Mgt Rptg Data) is the only one currently defined, and further that the two have been successfully connected.

Once an association between a staging database and a standalone data source has been established, selection of each in the respective panels 402, 404 results in display of the corresponding details, which may be once again modified. Although a single standalone data source is illustrated in FIG. 4, it will be apparent that a further selection of the "New" button in the standalone data source definition panel 404 will permit one or more additional standalone data sources to be associated with the staging database.

Referring once again to FIG. 3A, processing continues at block 304 where the configuration workstation, using a suitable user interface, operates to obtain data used to define user and roles assignments within the system. An example of such a user interface 500 is illustrated with respect to FIG. 5.

As shown, the user interface 500 comprises an enterprise or company definition panel 502, a user definition panel 504, a user details entry panel 506 and a role assignment panel 508. As shown in the company definition panel 502, controls (buttons) are provided to create a definition of a new enterprise or company or delete an existing definition of an enterprise or company. In the illustrated example, three different companies have been provided, entitled: ABC Client Company, F103 and LawFirm. Input boxes are provided next to each company allowing selection of the corresponding company; in the illustrated example, the LawFirm company has been selected. The user definition panel 504, in turn, provides controls that permit the establishment or deletion of users associated with the selected company. In the illustrated example, by selecting the "New" button in the user definition panel 504, a user is presented with the user details entry panel 506. In the details entry panel 506, various fields are provided that allow the user to enter data describing and/or identifying the user. Thus, the administrative user is able to enter data specifically identifying the standalone user, i.e., User Name, Full Name, First Name, Middle Name, Last Name, Gender and Timekeeper ID (TKID). A check box is provided that allow the user to be designated as active (when checked) or inactive (when not checked), thus controlling the defined user's ability to use access the system. As further shown, a password data entry field is provided that allows a password to be associated with this user identity upon selection of the corresponding password "Update" button. Additional fields for the entry of further information concerning the user are also provided, i.e., a base or start date field concerning the user's employment start date, an input field for designating a number of unsuccessful login attempts before the user is locked out of the system, as well as dropdown menus that allow selection of default applications and personas, as described in further detail below, for the user. A check box is also provided that permits the user's account to be locked when the "Set" button is clicked, thereby preventing the user from logging in to the system.

Finally, the role assignment panel 508 facilitates assignment of one or more roles to the user. In the example illustrated in FIG. 5, there are eleven roles defined (all having particular relevance to the LawFirm company): ABC Client, ClientMgr, CompACCChair, CompAdmin, CompEPCCChair, CompEPCCMember, CompIPCCChair, CompIPCCMember, PGMgr, Firm Manager and Super. In an embodiment, such user roles are created by an administrator using the configuration workstation by simply entering the name of each role, and possibly a description of each role, using text entry boxes in a suitable user interface (not shown). As further illustrated in the example, the role Super has been selected from the list on the left and, using the add (">>") button, assigned to the user as shown by the list on the right. As roles from the available roles list (left side) are assigned to the user (right side), they are removed from the available roles list. A delete ("<<") button is also provided that permits a previously assigned role to be removed (i.e., placed back in the available role list) for that user. As described in further detail below, the roles assigned to the user control what data is available to the user via a given application.

Referring once again to FIG. 3A, processing continues at block 306 where the configuration workstation, using a suitable user interface, operates to obtain data used to define personas. As used herein, a persona is a description of a function that a user may perform within an enterprise or company. To the extent that applications defined using the configuration workstation are created to support such functions, each application also has one or more personas associated therewith. By further associating each persona with one or more roles, a given user's assigned roles dictate which personas that are permitted to assume. An example of such a user interface 600 is illustrated with respect to FIG. 6.

As shown, the user interface 600 comprises a persona definition panel 602, a persona details entry panel 604 and a role assignment panel 606. As shown in the persona definition panel 502, controls (buttons) are provided to create a definition of a new persona or delete an existing definition of persona. In the illustrated example, seven different personas have been provided, entitled: ABC Client, Assoc Comp, Client Manager, Equity Ptr Comp, Firm Manager, Income Ptr Comp and Pract Grp Mgr. Input boxes are provided next to each persona allowing selection of the corresponding persona; in the illustrated example, the Firm Manager persona has been selected. The persona details entry panel 604 includes various fields (i.e., Name, Label and Comments) that permit data descriptive of the persona to be specified. In turn, the role assignment panel 606 facilitates assignment of one or more roles to the persona. In the example illustrated in FIG. 6, the same eleven roles illustrated in FIG. 5 are also provided. Once again, roles from the available roles list (left side) may be assigned to the persona (right side), or a previously assigned role may be removed (i.e., placed back in the available role list) for that persona. For example, as illustrated, the persona Firm Manager, in order to be applicable to a given user, needs either the Firm Manager or Super roles to be assigned to the user.

Referring once again to FIG. 3A, processing continues at block 308 where the configuration workstation, using a suitable user interface, operates to obtain data used to define applications as well as the object data structures and properties associated therewith. An example of such a user interface 700 is illustrated with respect to FIGS. 7-9.

As shown, the user interface 700 comprises an applications definition panel 702, an objects definition panel 704, a properties definition panel 706, a details entry panel 708 and an additional configuration panel 710. The details entry panel 708 further comprises controls in the form of selectable tabs that alternate the details entry panel 708 between different states; specifically, selection of the application details tab 708*a* causes the details entry panel 708 to display various data entry fields applicable to a selected application, selection of the object details tab 708*b* causes the details entry panel 708 to display various data entry fields applicable to a selected object data structure and selection of the properties details tab 708*c* causes the details entry panel 708 to display various data entry fields applicable to a selected property. Additionally, selection of the various tabs 708*a-c* controls functionality of the additional configuration panel.

As shown, each of the applications definition panel 702, the objects definition panel 704 and the properties definition panel 706 include controls (buttons) to create a definition of a respective new application, object or property or to delete an existing definition of a selected application, object or property. In the illustrated example, five different applications have been provided, entitled: Compensation, HRIS, Profitability, Reporting and Spreadsheets; nine different objects have been provided, entitled: Account, AccountGroup, Client, Department, MatStatus, Matter, Office, OfficeGroup and PracticeGroup; and seven different properties have been provided, entitled: BillAttyTkNum, ClientNum, CliMat, MatStatus, MatterNum, Name and RespAttyTkNum. Input boxes are provided next to each displayed application, object and property thereby allowing selection of a corresponding application, object and property; in the illustrated example, the Reporting application, Matter object data structure and MatStatus property have been selected.

In an embodiment, the entries displayed in the applications definition panel 702, the objects definition panel 704 and the properties definition panel 706 are hierarchically linked to each other. That is, the object data structures displayed in the objects definition panel 704 are determined according to the selected application in the applications definition panel 702, whereas the properties displayed in the properties definition panel 706 are determined according to the selected object data structure selected in the objects definition panel 704. Additionally, in an embodiment, each object data structure and its corresponding properties are available to be associated with any of the applications. In this manner, the meaningful context for any given piece of data can be established.

Thus, selections of a specific application, object data structure and property uniquely define the details that may be displayed in the details entry panel 708, as further refined by selection of a particular tab 708*a-c*. As shown in FIG. 7, the application details tab 708*a* has been selected such that the details entry panel 708 displays various data entry controls that may be used to configure the selected application. In particular, such controls include fields permitting the entry of identifying/descriptive data (e.g., Name, Label and Comments) for the selected application. A check box for toggling the application between an active an inactive state is also provided; in the illustrated example, the selected application is currently active. Additional button controls are provided. The "Run Wizard" button runs a wizard that can import object data structures and their properties from existing database tables. The "Import Spreadsheet" button allows an administrative user to select an existing spreadsheet, create a table in a staging database configured to hold the spreadsheet, and imports the spreadsheet into that table. The "Force Refresh" button set a configuration setting such that the semantic importer 208 will operate on all objects in the selected application on its next translation cycle. The "Drop Sync & Reset" button drops the synchronization tables in the staging database(s) such that the semantic importer will do a full drop and restore of the data in its next translation cycle. Furthermore, through selection of the application details tab 708*a*, the additional configuration panel 710 is configured to permit the addition of one or more available personas (left list) to the assigned personas list (right side) for the selected application, and for previously assigned personas to be unassigned to the selected application.

FIG. 8 illustrates the user interface 700 when the object details tab 708*b* has been selected resulting in the details entry panel 708 displaying various data entry controls that may be used to configure the selected object data structure. In particular, such controls include fields permitting the entry of identifying/descriptive data (e.g., Name, Label and Comments) for the selected object data structure. A drop down menu (DB Conn. List) permits selection of one of the various available staging databases where data relevant to this object may be obtained; in the illustrated example, the Management Reporting staging database has been selected. An additional drop down menu (Updated Opt.) permits selection of the frequency at which the selected staging database is checked for new data. The "Prefix" field establishes a unique set of characters to identify the object. This set of characters is prepended to the name of each specific object, making it unique across the entire database. The "Force Refresh" and "Force Drop & Rebuild" buttons perform the same functions as the "Force Refresh" and "Drop Sync & Reset" buttons described above relative to FIG. 7. A check box is provided to activate or deactivate the selected object data structure, where deactivation will cause the semantic importer 208 to simply ignore the deactivated object data structure. Additionally, a check box is provided that permits the selected object data structure to be designated as a "schema only" object data structure. In this case, the "schema only" object data structure does not expect to find data in corresponding staging database, but instead serves to define a structure that accepts data from an online input. In other words, while such a "schema only" object data structure will contribute to the resulting ontology, and will be available to connect to other objects, no actual data is retrieved from a staging database. Finally, either clicking on an object in the object list 704 or selection of the object details tab 708*b* causes the configuration panel 710 from which the user can see the full list of object settings.

FIG. 9 illustrates the user interface 700 when the property details tab 708*c* has been selected resulting in the details entry panel 708 displaying various data entry controls that may be used to configure the selected property. In particular, such controls include fields permitting the entry of identifying/descriptive data (e.g., Name, Label and Comments) for the selected property, i.e., the particular data in the staging database associated with this property. The non-editable "SQL Data Type" field refers to the data type for this property and is non-editable because of the property's association with a key, as described below. If not associated with a key, the data type for the property may be freely selected from a list of available data types. The "Characteristics" field allows association of the property with a property characteristic as defined in, for example, the Web Ontology Language (OWL) specification. The "Display Order" filed specifies the order for this property if it is included in the primary key. To this end, the illustrated check boxes allow the identification of the property as a subclass link, a primary key or a foreign key. If the property is a foreign key (FK), a panel opens up (not shown) allowing the identification of the related FK object and FK property. The remaining settings "Visible To User", "User Editable", and "Is AutoGenerated" are default settings for the property if it is shown in a user editable form in the web display.

Finally, selection of the property details tab 708*c* causes the additional configuration panel 710 to display various data entry fields for use in defining data validation criteria to be applied to the data associated with the selected property. As known in the art, such data validation criteria ensure that the data extracted from the standalone data source for this property conforms to the necessary characteristics for this data.

Referring once again to FIG. 3A, processing continues at block 310 where the configuration tables for the selected application and its corresponding object data structures and properties are generated. This may be accomplished, as described above, through selection of the "Force Refresh" and "Drop Sync & Reset" buttons as described above relative to FIG. 7. In the manner, the data entered into the user interface 700 for all active applications and objects is used to populate the configuration tables. Thereafter, at block 320, the configuration tables are "published" in the sense that they are stored in the control storage 206, thereby effectively making the application and its corresponding object data structure available for use in constructing user interfaces/dashboards.

Finally, at block 322, it is determined if any updates to existing applications, object data structures or properties, or additions of new applications, object data structures or properties are desired. If so, processing may continue at any of blocks 302-308 as necessary to effectuate the required updates and/or additions as described above.

Referring now to FIG. 3B, processing performed by the controller 204 is illustrated. Beginning at block 330, a determination is made whether an update of the data stored in the one or more staging databases is required. As noted previously (see FIG. 8 and corresponding description), part of the configuration table for a given application will include data indicating how often the staging database(s) for a given object data structure is updated. Alternatively, an updated of a given object data structure can be made on-demand using the "Force Refresh" button illustrated in FIGS. 7 and 8.

Regardless of the reason, once the need to update data from a given staging database is determined, processing continues at block 332 where data is obtained from the staging database(s) in accordance with the configuration tables. In an embodiment, rather than attempt to obtain and translate all data in a given staging database, it is first determined what data in the staging database(s) has been modified (added, changed or deleted) such that translations are performed only on the basis of such modified data. In another embodiment, the data obtained from the staging database(s) may be optionally validated in accordance with the data validation criteria defined for each property (see FIG. 9 and associated description) to ensure that the data is in suitable condition for translation. As a further optional (though preferred) step, processing may continue at block 334 where the controller, via the RDBMS running the control storage 206, prior to effectuating translation of the data obtained from the staging database(s) at block 332, first validates the ontology represented in the semantic database 210. Once again, the ontology for a given application is inherently defined in the configuration tables for that application. Thus, the controller can ascertain the ontology as currently reflected in the configuration tables and compare it to the data relationships established in the semantic database. If not, it is updated based on the newest information in the configuration tables, which reflect any changes to the applications, object data structures or properties.

Assuming the data obtained from the staging database(s) and the semantic database ontology are validated, when performed, processing continues at block 336 where the semantic importer 208 performs the translations of the obtained data into the semantic data format, as described above. Thereafter, at block 338, processing continues with storage of the now-translated semantic data into the semantic database.

Figure 10:
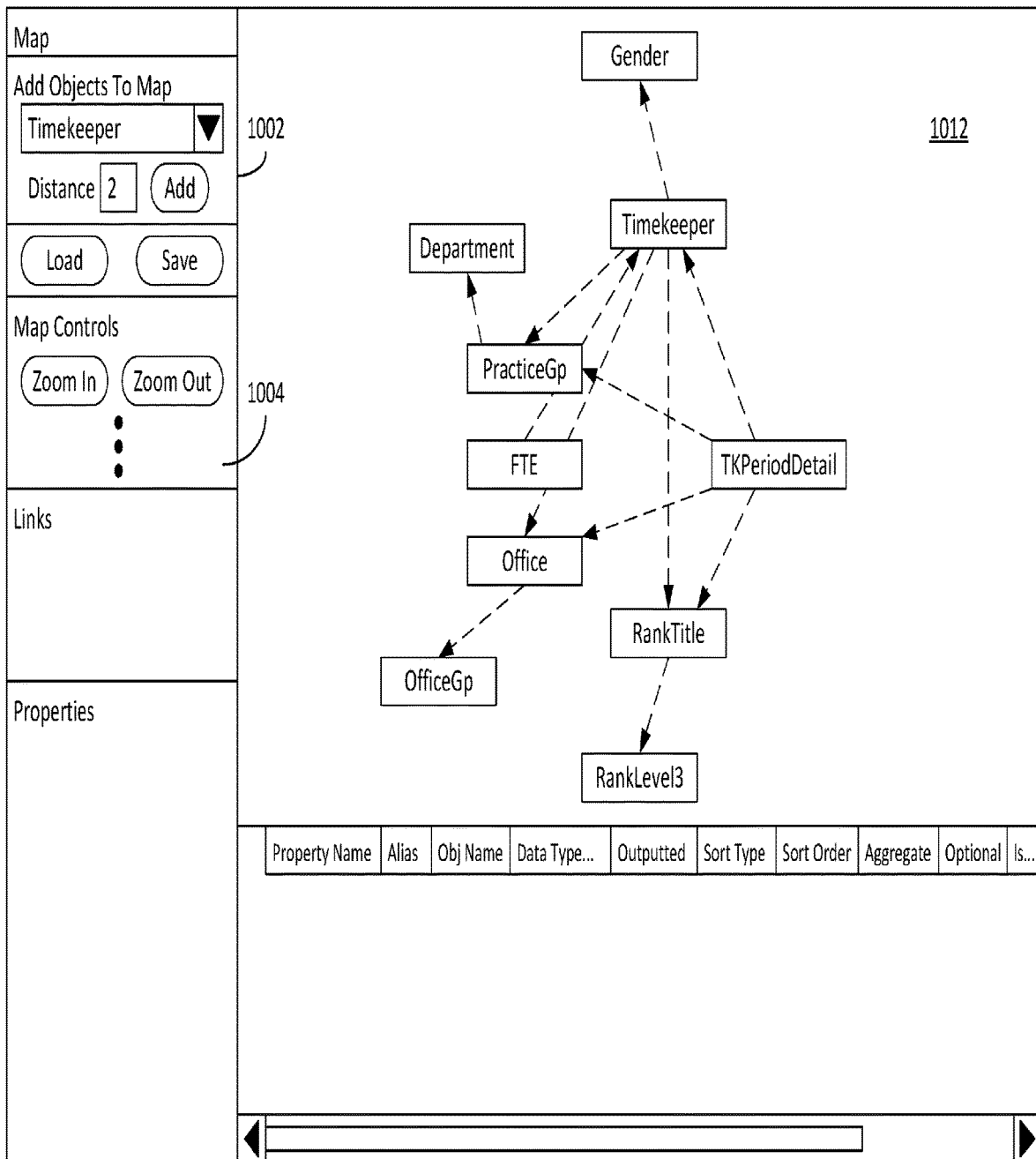
FIGS. 10-12 are example data entry user interfaces for the configuration of maps used in the creation of user interfaces for displaying data in accordance with the instant disclosure.

As described above, the designer workstation 216 may be used to define user interfaces in the form of dashboards or user input forms based on the semantic data stored in the semantic database. An example of this is illustrated in FIGS. 10-13. In particular, FIGS. 10-12 illustrate usage of a "map" interface design platform to define a "data plan" that may be used to describe the data to be made available to a dashboard, report or form. In particular, the design platform may provide a map creation screen 1000 that includes a map design panel 1012 that displays various object data structures added to the map. To that end, an objects control panel 1002 is provided that permits selection of any available object data structures across all applications, as defined according to the configuration tables. Using a dropdown menu in this case, an object data structure may be chosen such that selection of the "Add" button causes the chosen object data structure to be added to map design panel 1012. A distance data entry field is also provided in the objects control panel 1002. Treating the chosen object data structure as a central node in a graph representation, the value entered into the distance field determines how many edges away from the central node are displayed in the map design panel 1012. Stated another way, the distance value determines what other object data structures, related through common properties, are displayed along with the chosen object data structure. Thus, with reference to the illustrated example, the Timekeeper object has been chosen along with a distance value of two. As a result, all object data structures no more than two levels away from the Timekeeper object, as reflected in the ontology of the configuration tables, are also displayed in the map design panel 1012. In the illustrated example, the following objects meet the designated distance criteria. Gender, TkPeriodDetail, RankTitle, RankLevel3, Office, OfficeGp, FTE, PracticeGp and Department. The "Add" function can be repeated to extend the objects currently showing on the map. In order to navigate the map, various map controls 1004, e.g., zoom in, zoom out, etc. may be provided as shown.

Thereafter, selection of any of the object data structure illustrated in the map design panel 1012 results in population of a link list 1006 and a corresponding properties list 1008 as shown in FIG. 11. The link list 1006 shows the links between the selected object data structure and the other illustrated object data structures. For example, in the illustrated example, selection of the Timekeeper object results in the display of links, among others not shown, between properties of the Timekeeper object and the RankTitle object and the Gender object. For example, the for the link "RankID=>RankTitle.ID" illustrates the fact that the "RankID" property for the Timekeeper object is a key to the ID property of the RankTitle object. The properties list 1008 shows the available properties for the selected object. By selecting one or more of these properties, the designer is able to designate the properties (data) to be represented in the user interface/dashboard. Once the desired properties for the selected node are determined, the designer is able to define a "path" through the other object data structurers by selecting nodes connected to the other nodes in the path. Once again, properties for this newly selected node may be selected, thereby designating further data to be included in the user interface/dashboard. This is illustrated in FIG. 12 where a path including the Gender, Timekeeper, PracticeGp and Department objects (as designated by the heavy outlines for those objects) has been defined. Additionally, as various properties for the objects in the path are added, a selected properties list 1010 is updated to illustrate the selected properties and their relationships to the various path-defining objects. As shown, the selected properties set forth in the selected properties list have settings available. The "Alias" field allows the user to reassign the name of the property. The "Outputted" check box controls whether the property will appear in the output for display. The "Sort Type" box allows the user to assign a sort type (none, ascending, or descending). "Sort Order" is the order in which this property impact the overall sort, if any. The "Aggregate" selection allows setting this property to be an aggregate such as sum, max, min, count. The optional check edit allows a property to be optional such that a row will still be included even if the property is missing or its value is null. Other controls (not shown) allow filters to be set, a limit put on the number of records returned, and an indication to make the result set distinct. Once the desired path and selected properties have been defined, the designer may select the "Save" button illustrated in an action panel 1014, thereby saving the selected objects and properties to be used as the basis for the user interface/dashboard. On demand (as described below) these descriptions are converted into SPARQL queries for obtaining data from the semantic database 210.

Using known functionality provided by the interface design platform, the designer is now able to select data visualizations that may be used for the display of the data made available through the above-described data selection process. By selecting a given data source (object and property), the designer is presented with visualization options that could be used for the types of selected data. Using these visualization options, the designer is able to add various visualizations to the dashboard. An example of dashboard is illustrated in FIG. 13, in which the dashboard 1300 includes various visualizations 1302-1312 that include, in this example, bar charts, pie charts, tables and line graphs. Those skilled in the art will appreciate that various other visualizations may be equally employed as a function, in part, on the selected data types.

Once designed, the user interface/dashboard corresponding to a specific application is provided to the semantic database using an appropriate data interchange format such as Extensible Markup Language (XML) or JavaScript Object Notation (JSON).

Referring now to FIG. 3C, processing performed by the web server 212 is illustrated. Beginning at block 340, the web server receives a request from a user device 214 to obtain data from the system 200, which request includes identifying user credentials for the user of the user device. Such credentials may include data of the type illustrated in FIG. 5, e.g., a user name, password, etc. When the identifying user credentials match a validly defined user in the system, processing continues at block 342, where the web server 212 queries the semantic database 210 to determine the user's assigned roles and personas, including the personas for the user corresponding to the user's default application. Additionally, at block 344, the web server obtains a list of the applications corresponding to the user's default persona, i.e., those applications having a matching persona as defined above. Thereafter, at block 346, the web server obtains available navigations for the default application, including the XML files defining the dashboards for the default application. An example of this is illustrated in FIG. 13 where selectable navigations 1324 are illustrated in side bar and include dashboards entitled: Productivity, Statistics, Rate and Realization. Additionally, selectors 1320, 1322 may be provided such that the user can select from among his/her assigned personas and available applications. With this information in hand, at block 348, the web server then queries the semantic database (for example via the above-noted SPARQL queries) for the semantic data specified in the previously obtained XML files. The user's default persona and role determine which objects, associated with that application's persona, are available for presentation according to the user's role. In this manner, the user is only presented with data commensurate with his/her default role. Processing continues at block 350 where the requested semantic data is used to generate the user interface/dashboard, which is then provided to the requesting user device for display on a display of the user device. Finally, processing may continue at block 352 where a determination is continually made to determine if the user makes a new navigation selection necessitating request new semantic data and generation of the user interface at blocks 348, 350.

What is claimed is:

1. A method for enabling access to data from a plurality of different data sources, the method comprising:
   receiving input that associates one or more staging database with the plurality of different data sources;
   generating one or more configuration table based on the input, the one or more configuration table including designations of where data for a plurality of object data structures is found in at least one of the plurality of different data sources;
   transferring data for the plurality of object data structures into the one or more staging database based on the designations of the one or more configuration table;
   translating the data from the one or more staging database into a semantic data format to provide semantic data that links multiple of the plurality of object data structures; and
   causing at least one user interface to be displayed on a user device using the semantic data, the user interface including at least one of a chart, table or graph that uses multiple of the linked plurality of object data structures.

2. The method of claim 1, wherein
   receiving input that associates the one or more staging database with the plurality of different data sources includes receiving input that associates a plurality of staging databases with the plurality of different data sources.

3. The method of claim 1, wherein
   the one or more configuration table includes designations of where data for the plurality of object data structure structures is found in multiple of the plurality of different data sources.

4. The method of claim 1, wherein
   at least one object data structure comprises at least one property defining available data for the at least one object data structure in at least one of the plurality of different data sources.

5. The method of claim 1, comprising
   extracting the data to the one or more staging database from the plurality of different data sources, and
   validating the data according to data validation criteria prior to storage in the one or more staging database.

6. A system configured to perform the method of claim 1, the system including at least one processing device and at least one machine-readable storage device.

7. At least one machine-readable storage device having stored thereon instructions configured to be executed by at least one processing device to cause the method of claim 1.

8. A method for enabling access to data from a plurality of different data sources, the method comprising:
   receiving a first input that associates a first staging database with a first standalone data source;
   receiving a second input that associates a second staging database with a second standalone data source;
   generating one or more configuration table based on the first input and the second input, the one or more configuration table including designations of where data for a plurality of object data structures is found in the first standalone data source and the second standalone data source;
   transferring data for the plurality of object data structures into the first staging database and the second staging database based on the designations of the one or more configuration table;
   combining the data from the first staging database and the second staging database into a semantic database that links multiple of the plurality of object data structures; and
   causing at least one user interface to be displayed on a user device using the semantic database, the user interface including at least one of a chart, table or graph that uses multiple of the linked plurality of object data structures.

9. The method of claim 8, wherein
   the first staging database obtains data from both the first standalone data source and the second standalone data source.

10. The method of claim 8, wherein
    the first staging database obtains data from the first standalone data source, and the first staging database does not obtain data from the second standalone data source.

11. The method of claim 8, wherein at least one configuration table includes designations of where data for the plurality of object data structures is found in each of the first standalone data source and the second standalone data source.

12. The method of claim 8, wherein at least one object data structure comprises at least one property defining available data for the at least one object data structure in at least one of the first staging database and the second staging database.

13. A system configured to perform the method of claim 8, the system including at least one processing device and at least one machine-readable storage device.

14. At least one machine-readable storage device having stored thereon instructions configured to be executed by at least one processing device to cause the method of claim 8.

* * * * *